(12) United States Patent
Jandhyam

(10) Patent No.: US 9,348,775 B2
(45) Date of Patent: May 24, 2016

(54) OUT-OF-ORDER EXECUTION OF BUS TRANSACTIONS

(75) Inventor: Krishna S A Jandhyam, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 166 days.

(21) Appl. No.: 13/422,021

(22) Filed: Mar. 16, 2012

(65) Prior Publication Data

US 2013/0246682 A1    Sep. 19, 2013

(51) Int. Cl.
G06F 13/16    (2006.01)
G06F 9/38    (2006.01)
G06F 3/06    (2006.01)

(52) U.S. Cl.
CPC .......... *G06F 13/1626* (2013.01); *G06F 3/0659* (2013.01); *G06F 9/3836* (2013.01); *G06F 13/16* (2013.01)

(58) Field of Classification Search
CPC .... G06F 9/3836; G06F 9/3838; G06F 9/3855
USPC .............................................. 710/6, 306–310
See application file for complete search history.

(56) References Cited

U.S. PATENT DOCUMENTS

| | | | |
|---|---|---|---|
| 5,875,309 A | 2/1999 | Itkowsky et al. | |
| 6,216,178 B1 | 4/2001 | Stracovsky et al. | |
| 6,668,313 B2 | 12/2003 | Koob et al. | |
| 6,697,923 B2 * | 2/2004 | Chen ......................... | G06F 5/10 711/154 |
| 6,772,300 B1 | 8/2004 | Manseau | |
| 6,907,002 B2 * | 6/2005 | Beshai et al. ................ | 370/230 |
| 7,043,593 B1 | 5/2006 | Tischler et al. | |
| 7,181,556 B2 * | 2/2007 | Gwilt ............................ | 710/110 |
| 7,243,200 B2 | 7/2007 | Day et al. | |
| 7,398,361 B2 * | 7/2008 | Gunna et al. .................. | 711/146 |
| 7,555,579 B2 * | 6/2009 | Figueira ........................ | 710/52 |
| 7,603,490 B2 | 10/2009 | Biran et al. | |
| 7,647,441 B2 | 1/2010 | Wingard et al. | |
| 7,657,791 B2 | 2/2010 | Codrescu et al. | |
| 7,663,051 B2 | 2/2010 | Kamath et al. | |
| 7,718,882 B2 | 5/2010 | Devalapalli et al. | |
| 7,804,735 B2 | 9/2010 | Mao et al. | |
| 1,005,543 A1 | 3/2011 | Chen et al. | |
| 8,046,513 B2 * | 10/2011 | Chang .......................... | 710/112 |
| 8,145,805 B2 * | 3/2012 | Miller et al. ................... | 710/39 |
| 8,332,564 B2 * | 12/2012 | Matterne et al. ............. | 710/310 |
| 8,489,794 B2 * | 7/2013 | Byrne et al. .................. | 710/311 |
| 8,631,184 B2 * | 1/2014 | Mangano et al. ............ | 710/310 |
| 8,656,078 B2 * | 2/2014 | Lim ............................. | 710/110 |
| 8,677,045 B2 * | 3/2014 | Mangano et al. ............ | 710/310 |
| 8,688,853 B2 * | 4/2014 | Clune et al. ................... | 709/232 |
| 8,880,745 B2 * | 11/2014 | Jandhyam ............. | G06F 13/385 710/33 |
| 8,886,844 B2 * | 11/2014 | Jandhyam ............. | G06F 3/0659 710/33 |

(Continued)

FOREIGN PATENT DOCUMENTS

EP    2126893 A1    12/2009

OTHER PUBLICATIONS

Xilinx—"AXI Reference Guide"; 82 pages, Dated Mar. 7, 2011.*

(Continued)

*Primary Examiner* — Brian Misiura
(74) *Attorney, Agent, or Firm* — Patent Capital Group

(57) ABSTRACT

A slave-interface unit for use with a system-on-a-chip bus (such as an AXI bus) executes received transactions out-of-order while accounting for groups of in-order transactions.

19 Claims, 13 Drawing Sheets

(56) References Cited

U.S. PATENT DOCUMENTS

| | | |
|---|---|---|
| 2003/0217239 A1 | 11/2003 | Jeddeloh |
| 2006/0123206 A1 | 6/2006 | Barrett et al. |
| 2007/0067549 A1 | 3/2007 | Gehman |
| 2009/0172250 A1 | 7/2009 | Allen et al. |
| 2009/0177821 A1 | 7/2009 | Dinkjian et al. |
| 2009/0216993 A1 | 8/2009 | Venkumahanti et al. |
| 2009/0240896 A1 | 9/2009 | Kang |
| 2010/0306423 A1 | 12/2010 | Hashimoto |
| 2011/0221743 A1 | 9/2011 | Keall et al. |
| 2012/0159037 A1* | 6/2012 | Kwon et al. ............. 710/317 |
| 2014/0101339 A1* | 4/2014 | Jandhyam et al. ............. 710/6 |
| 2014/0101340 A1* | 4/2014 | Jandhyam et al. ............. 710/6 |

OTHER PUBLICATIONS

"Hardware/Software Tradeoffs: A General Design Principle?"; 3 pages, Dated Jan. 1985.*

International Search Report and Written Opinion of PCT Application Serial No. PCT/US2013/031865 mailed Jul. 26, 2013, 12 pages.

* cited by examiner

OUT-OF-ORDER EXECUTION OF BUS TRANSACTIONS

TECHNICAL FIELD

Embodiments of the invention generally relate to bus transactions and, in particular, to efficiently scheduling bus transactions to occur in an order different from that in which they are received.

BACKGROUND

As transistors shrink and die sizes grow, more and more digital-logic system components traditionally implemented as separate chips in discrete packages are being implemented together on a single chip (a so-called "system on a chip" or "SoC"). Internal buses on the SoC connect the various internal components; unlike traditional, off-chip buses, the on-chip buses need not be the bandwidth-limiting factor in communication between components. For example, while it may be expensive in resources, area, and power to double the bandwidth of an (e.g.) off-chip printed-circuit-board bus, it may be comparatively cheap to do so for an on-chip bus. Furthermore, the less-severe crosstalk, reflections, and/or other noise on-chip buses are exposed to may make it easier to run on-chip buses at higher frequencies (e.g., at the same clock frequencies at which the SoC components themselves run). Special care must be taken, however, to maximize the benefits of the advantages presented by on-chip buses.

Out-of-order execution of transactions received by a shared resource is one way to increase the efficiency of on-chip buses. For example, a memory (an example of a bus "slave") may be shared by two on-chip processors (examples of bus "masters"). The throughput to and from one master may be relatively high and the throughput to the other master may be relatively low (due to any one of many design factors and considerations). In this case, a long series of transactions between the slave and the slow master may disadvantageously delay a later-received transaction between the slave and the fast master (the "fast" transaction may be received after all the "slow" transactions have been received, but are still executing, or may be received during receipt of—or "interleaved" with—the slow transactions). By allowing transactions to execute out-of-order, the slow transactions may be temporarily suspended so that the fast transaction may execute. The increase in total execution time for the slow transactions may be negligible, while the fast transaction avoids a potentially significant delay.

One example of a protocol that supports out-of-order execution is known as the Advanced Microcontroller Bus Architecture ("AMBA"), and specifically an aspect of it called multi-layer Advanced Extensible Interface, or "multi-layer AXI." Multi-layer AXI is an architecture capable of providing the maximum bandwidth between each of the masters and the slaves in a system while requiring only a routing density comparable to that of the SoC components. Every connection in a multi-layer AXI system looks like, and behaves like, a direct master-slave connection; existing peripheral and sub-systems (e.g., those not programmed for the advanced features of multi-layer AXI) may thus be compatibly connected via the architecture. One aspect of multi-layer AXI that enables these features is the association of an identification ("ID") tag with each bus transaction; transactions having the same IDs have internal dependencies and must be completed in order, while transactions having different IDs may be completed in any order. Multi-layer AXI also supports write-data interleaving, in which groups of write data transactions from two or more masters are received, at a slave, interspersed with each other; the slave tracks and maintains the original sources of the transactions and honors any dependencies therebetween.

Any efficient implementation of an SoC bus protocol like multi-layer AXI, if it accommodates out-of-order execution, must therefore account for the design challenges that groups of in-order transactions and/or data interleaving present. Existing designs may use first-in-first-out ("FIFO") and/or simple buffers to capture bus transaction requests as they are received at a slave, but these designs require sophisticated control logic to account for, and properly deal with, the mixture of in-order and out-of-order transactions as well as control logic to de-interleave received data. These implementations are thus large, inefficient, and power-hungry; a need therefore exists for a small, elegant, low-power implementation.

SUMMARY

In general, various aspects of the systems and methods described herein execute bus transactions in an order different from that in which they were received. Groups of in-order transactions (e.g., "burst" transactions) are accounted for—i.e., their order is preserved—by storing information regarding their dependencies; when a next transaction is to be selected for execution, only the first transaction of a group of in-order transactions is considered as eligible for execution (along with any other pending out-of-order transactions and/or other groups of in-order transactions). In one embodiment, the groups of in-order transaction are stored using a hardware linked list; the first transaction in the group points to the second transaction, the second to the third, and so on. An additional hardware linked list may be used to receive, and account for, interleaved data.

In one aspect, system for executing bus transactions includes address and data buffers and control circuitry. The data buffer stores write data associated with transactions received from a bus, and the address buffer stores (i) write addresses associated with transactions received from the bus and (ii) information regarding in-order dependencies among the transactions. The control circuitry selects a received transaction for out-of-order execution in accordance with the in-order dependencies.

The address buffer may include a linked list, which may include a series of in-order transactions. Selecting the received transaction may include selecting a head of the series of the in-order transactions. The data buffer may include a linked list, which may be include a series of related write data received on the bus interleaved with unrelated write data. The control circuitry may include a control buffer for storing information linking write data and write addresses, an arbitration unit for selecting the received transaction, a free-buffer-list FIFO for storing available locations in the data buffer, a burst shaper for chopping a received burst into smaller bursts, and/or a completed list for storing information regarding completed transactions.

In another aspect, a method for executing bus transactions includes storing write data and write address associated with transactions received from a bus. Information regarding in-order dependencies among the transactions is also stored. A received transaction is selected for out-of-order execution in accordance with (i.e., in a manner that respects) the in-order dependencies.

Storing information regarding in-order dependencies may include linking a first in-order transaction to a second in-order transaction. Selecting the received transaction may include selecting a head of a series of linked transactions. A storing write data may include linking a series of related write data received on the bus interleaved with unrelated write data. A burst of write data may be shaped in accordance with a slave interface.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
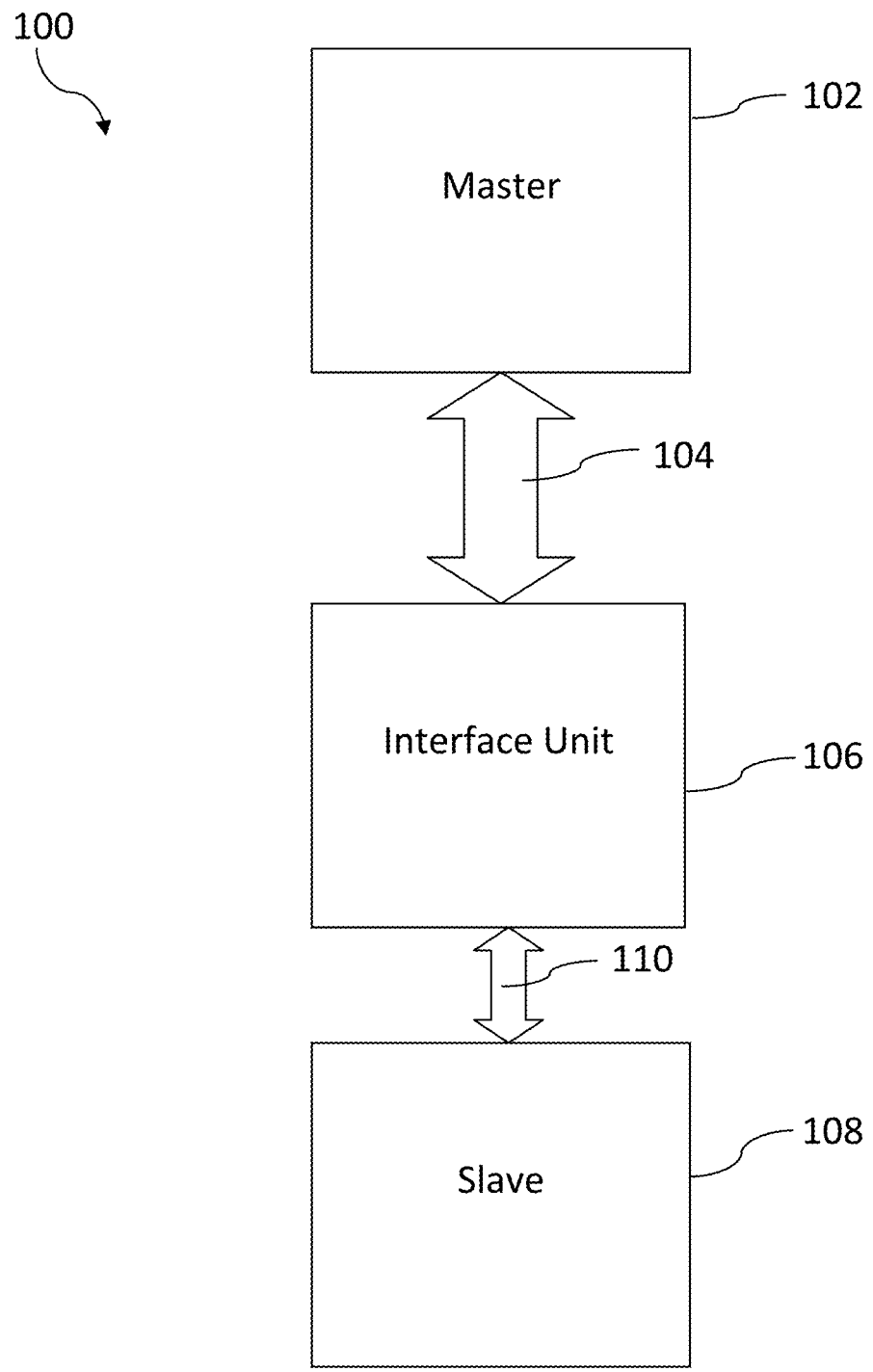
FIG. 1 illustrates a basic master/slave bus architecture.

A basic master-slave interface 100 is shown in FIG. 1. A bus master 102 communicates over a bus 104 (such as an AXI bus or any other SoC bus) with an interface unit 106. A slave 108, in turn, communicates with the interface unit via a local link 110. The master 102 may send read or write transactions over the bus 104; the interface unit 106 receives the transactions and fulfills them by forwarding them to the slave 108. In the simplest case, the interface unit merely forwards the requests to the slave 108 as they are received; as explained in greater detail below, however, the interface unit 106 may include buffers (or other means of temporary storage) to store the incoming transactions and execute them at a later point in time. Only a single master 102 and slave 110 are shown, but any number of masters 102 and slaves 110 is within the scope of the current invention. In these more complicated systems, the bus 104 may be a network or "fabric" of bus connections connecting the various components.

Figure 2:
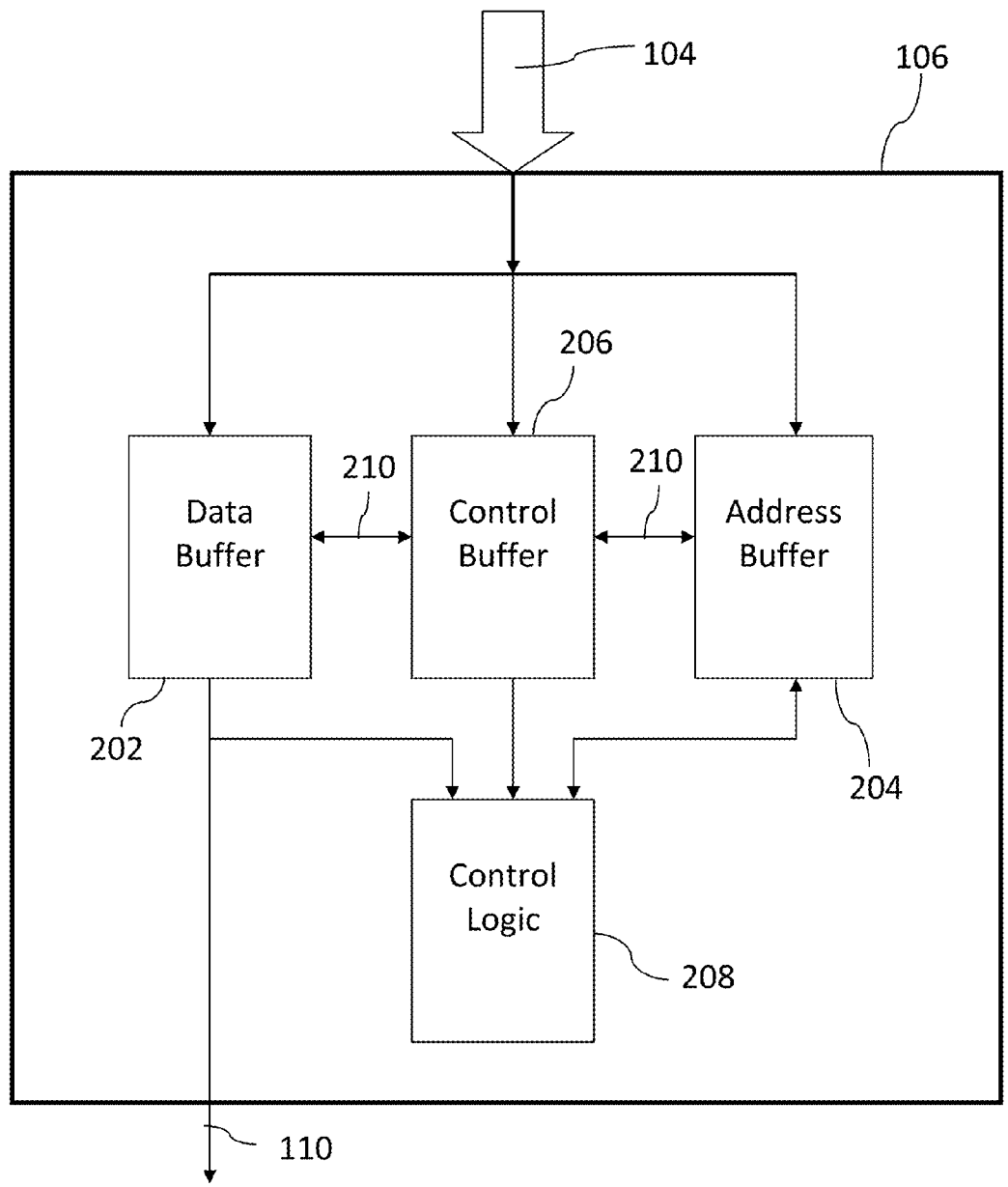
FIG. 2 illustrates a slave interface unit in accordance with an embodiment of the invention.

A more detailed representation of the interface unit 106 is shown in FIG. 2. The bus 104 may deliver bus transactions from the master 102 in the form of read addresses and/or write addresses and associated write data (each transaction possibly having control/status information bundled therein). In the case of an incoming write transaction, a data buffer 202 may be used to store the incoming write data, an address buffer 204 may be used to store the incoming write addresses, and a control buffer 206 may be used to store the incoming control/status information (e.g., an ID tag). Similarly, in the case of an incoming read transaction, the address buffer 204 and the control buffer 206 may be used to store the incoming read address and control/status information; the data buffer 202 may be used to hold the read data once it is read out from the slave 108. The particular arrangement of the buffers 202, 204, 206 is, however, not meant to be limiting, and any combination or permutation of the three buffers 202, 204, 206 is within the scope of the current invention. Each buffer 202, 204, 206 may be implemented in any kind of storage medium, device, or structure, including (for example) partitions or sections in a random-access memory, hardware registers, flip-flops, or latches.

As explained in greater detail below, the buffers 202, 204, 206 store information related to the interdependencies of bus transactions as well as the actual transactions. For example, a transaction having no dependencies with respect to other transactions may be stored by itself in the buffers 202, 204, 206, while a group of transactions having a dependency (i.e., the transactions in the group must be executed in-order) may have that information encoded into the buffers 202, 204, 206. In one embodiment, the address buffer 204 stores this dependency information as a hardware linked list; the first transaction in such a group of dependent transactions is stored with a link to the second transaction, the second is stored with a link to the third, and so on. In the case of a multi-layer AXI bus, the control buffer 206 may store the ID tag associated with each bus transaction; as a new transaction is received, its ID tag is examined. If it matches the ID tag of one or more transactions already received, the new transaction is added to the end of a linked list representing the rest of the similarly tagged transactions. Received transactions having unique ID tags are simply added to the buffers 202, 204, 206.

Similarly, as also explained in greater detail below, the data buffer 202 may include linked lists of received data. As interleaved transactions are received (i.e., two sets of unrelated transactions received from two different bus masters interspersed with each other), data associated with the transactions may be stored in the data buffer 202 in the order it is received. As the data entries are stored, however, pointers to previously received, related data are also stored and associated with them (as, e.g., another field in a buffer row, as explained in greater detail below). A group of related data may thus be read from the data buffer 202 by following the links from the first data entry, despite each data entry being stored throughout the data buffer 202.

Once the incoming transactions are stored in the buffers 202, 204, 206, control logic 208 may be used to select a next transaction, or set of transactions, for execution. In one embodiment, the control logic considers each stand-alone transaction and the head of each linked list of dependent transactions when determining a next transaction to execute. Pointers or links 210 (e.g., an address of an entry in a first buffer stored as a data field in a second) between the buffers 202, 204, 206 may be used to identify the data, address, and control information associated with each transaction. Once a transaction has been executed, the control logic 208 removes it from the buffers 202, 204, 206.

Figure 3A:
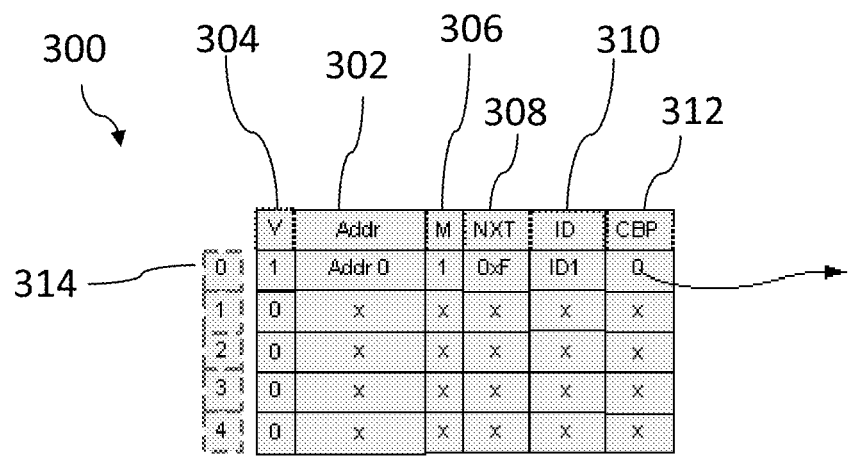
FIGS. 3A, 3B, 4A, 4B, and 5 illustrate address buffers in accordance with embodiments of the invention.

One implementation of an address buffer 300 is illustrated in FIG. 3A. In this implementation, which for illustrative purposes is explained using a write operation, the address buffer stores write addresses 302. One of skill in the art will understand that the address buffer may be also used to store read addresses. Associated with each write address 302 is a valid bit 304 that indicates whether a given entry holds a valid address (e.g., the valid bit 304 hold a binary 1 to indicate a valid address and a binary 0 for an invalid address). A mask bit 306 indicates whether a valid address should be considered for arbitration and execution; transactions that are not the heads of linked lists, for example, may be masked off. A next-transaction address 308 includes a pointer to a next transaction, if any, in a linked list of transactions. An ID tag 310 stores a transaction ID, such as the ID used in multi-layer AXI buses, for each address. A control-buffer pointer 312 points to a corresponding entry in a control buffer (e.g., the control buffer 206 discussed above). The current invention is not limited to this particular implementation, however, and one of skill in the art will understand that the previously described information may be stored in any a variety of ways.

The operation of the address buffer 300 will now be explained in greater detail. With reference again to FIG. 3A, the address buffer 300 holds a first transaction 314 at an entry 0 in the buffer 300. When this transaction arrives, its ID 310 (in this example, "ID1") is not equal to that of any existing entries in the address buffer 300; the new transaction 314 is added, marked as valid 304, and marked as not masked as indicated at 306. In one embodiment, the next-transaction address 308 is set to a constant (e.g., 0xF) to indicate it is the last entry in a linked list having that ID 310 (in this case, it is the first, last, and only entry in the linked list). Its entry in the control-buffer pointer field 312 points to a corresponding entry in the control buffer.

Figure 3B:
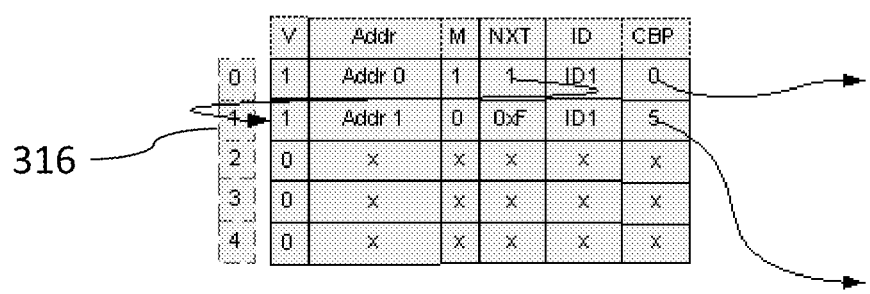

In FIG. 3B, a second transaction 316 arrives and is stored in a second entry 1 in the address buffer 300; this transaction 316 has the same ID 310 as the first transaction 314. To reflect this dependence between the first 314 and second 316 transactions, the next address 308 of the first transaction 314 is modified to include the address ("1") of the second transaction 316 in the buffer 300. The second transaction 316 is marked as valid as indicated at 304, but, because it is not the head of a linked list, its mask bit 306 is marked as masked. In general, when a transaction arrives that has an ID equal to that of any other entries in the address buffer 300, the new transaction is linked to the end of the list of existing entries (as indicated, for example, by the entry having a next address 308 of 0xF) and masked.

The second transaction 316, being masked, is ineligible for execution (reflecting the in-order nature of the first 314 and second 316 transactions; the first transaction must be executed first). The second transaction 316 may be unmasked when the first transaction 314 has executed. Upon execution of the first transaction 314, its next address 308 is examined and, if not null (e.g., 0xF), its corresponding transaction (i.e., the second transaction 316) is identified and unmasked. Being unmasked, the second transaction 316 is thus eligible for execution. This chain of unmasking transactions continues until the last transaction in the linked list is identified and executed.

Figure 4A:
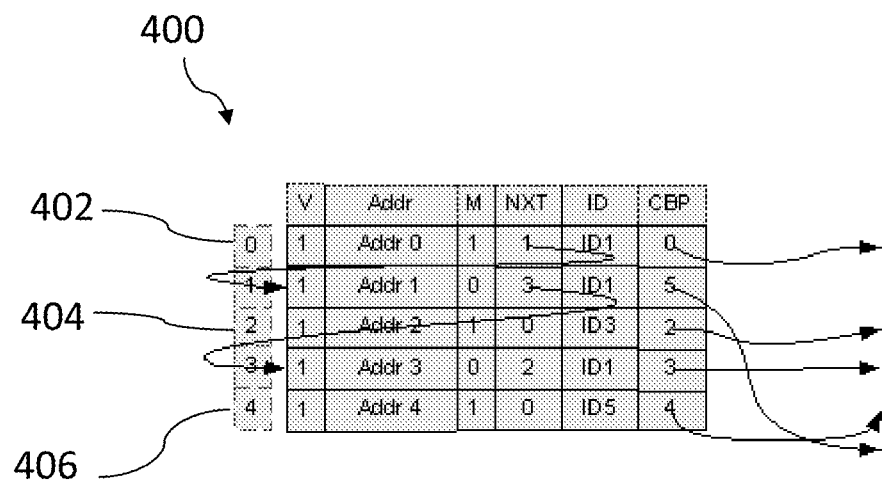
Figure 4B:
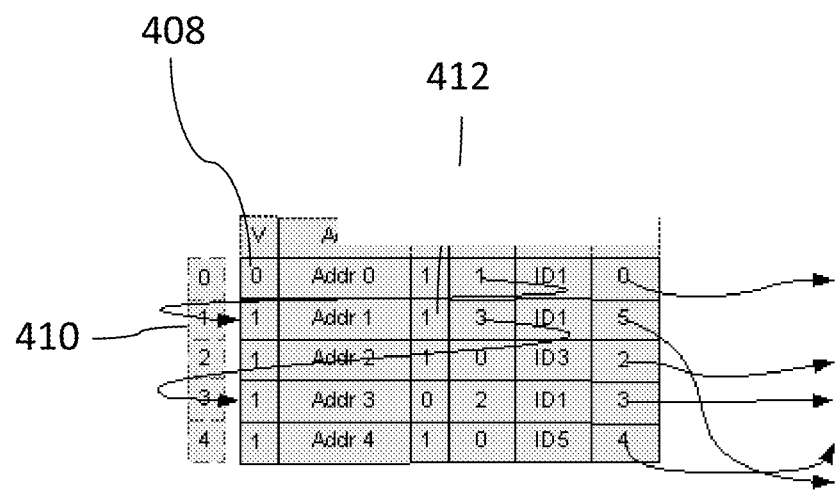

Another example of an address buffer 400 is illustrated in FIG. 4A. Three transactions are stored in the address buffer 400: a first transaction 402 at entry 0 (which is the head of a three-member linked list of transactions that also includes the transactions at entries 1 and 3), a second transaction 404 at entry 2, and a third transaction 406 at entry 4. An arbitration unit (within, for example, the control logic 208 described above with reference to FIG. 2) decides which of the three transactions 402, 404, 406 will next execute. Any suitable arbitration unit and/or functionality is within the scope of the current invention, as one of skill in the art will understand, and the current invention is not limited to any particular means or method of arbitration. In this example, however, the arbitration logic selects the first transaction 402 for execution, and the state of the buffer 400 after said execution is illustrated in FIG. 4B. In this figure, the valid bit 408 of the first transaction 402 has been cleared to reflect the execution of this transaction, and the next member of the linked list, the entry 410 at location 1, has its mask bit 412 set to indicate that it is now available for execution.

Figure 5:
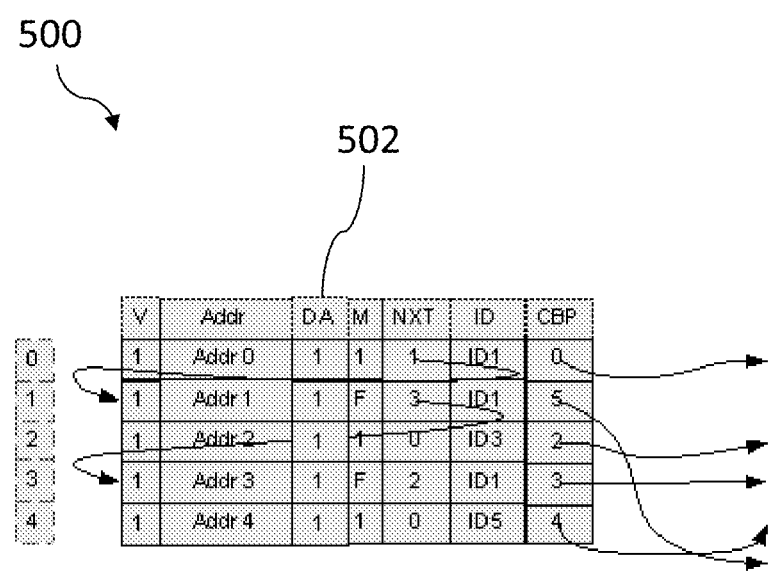

In one embodiment, another field may be included in the address buffer to facilitate the execution of interleaved transactions. FIG. 5 illustrates an address buffer 500 that includes a data-arrived (or "DA") field 502 that is asserted when all of the data associated with a given address has arrived (said data being stored in, for example, the data buffer 202 described above with reference to FIG. 2). In this embodiment, a number representing the total number of pieces (or "beats") of data is sent from a bus master along with the rest of the control information associated with a transaction. As each beat of data arrives, a beat counter in the control logic 208 increments, and the control logic compares the value of the counter with the total number of beats associated with the given transaction. When the numbers match, all the data has arrived, and the data-arrived field 502 is set, indicating that the corresponding transaction is available for arbitration.

Figure 6:
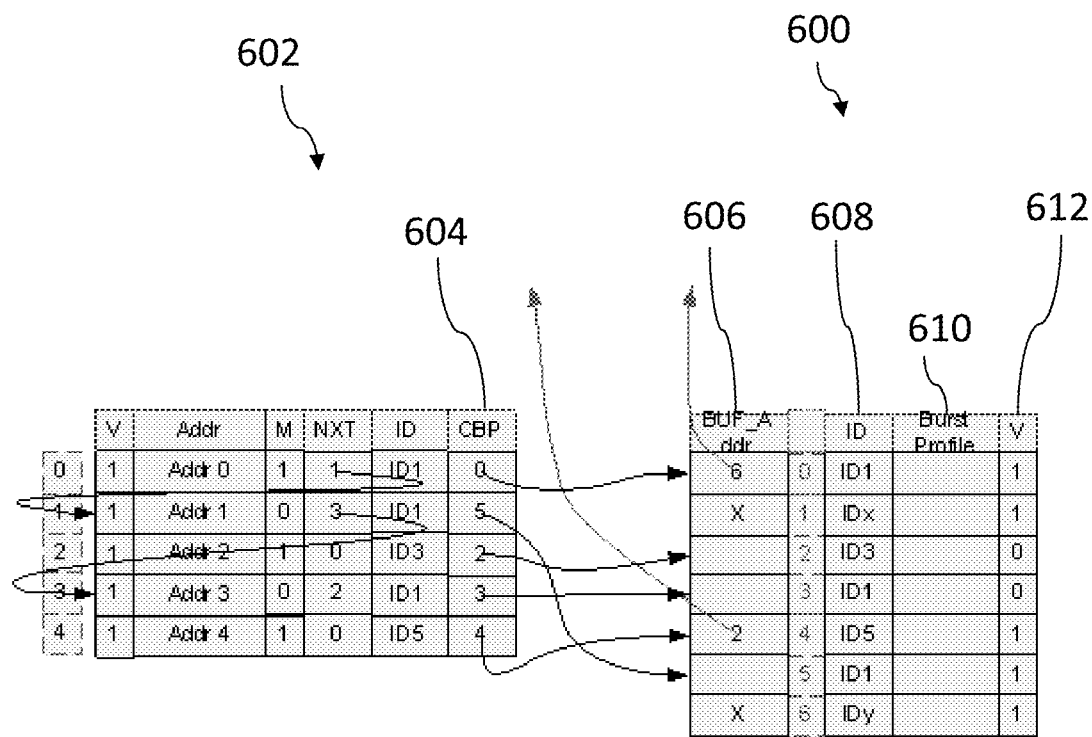
FIG. 6 illustrates a control buffer in accordance with an embodiment of the invention.

An illustrative example of a control buffer 600 is shown with another address buffer 602 in FIG. 6. As mentioned above, the control buffer 600 stores control information associated with each incoming transaction; the address buffer 602 includes a control-buffer pointer field 604 that links to entries in the control buffer 600. In this example, entry 0 in the address buffer 602 includes a pointer 604 to entry 0 in the control buffer 600, entry 1 in the address buffer 602 includes a pointer 604 to entry 5 in the control buffer 600, entry 2 in the address buffer 602 includes a pointer 604 to entry 2 in the control buffer 600, entry 3 in the address buffer 602 includes a pointer 604 to entry 3 in the control buffer 600, and entry 4 in the address buffer 602 includes a pointer 604 to entry 4 in the control buffer 600.

Each entry in the control buffer 600 includes a pointer 606 to a corresponding entry in the data buffer; in another embodiment, the control buffer 600 includes two pointers 606 for each entry, wherein one pointer indicates a first data beat associated with a transaction and the other pointer indicates a last data beat associated with a transaction. Each entry in the control buffer 600 may include additional information associated with each transaction. An ID field 608 may store the AXI (or other protocol) ID of a transaction, and a burst profile 610 may contain burst-related information about a transaction (such as, for example, burst length, burst size, burst type, and/or byte lane). A valid bit 612 indicates whether an entry is valid or invalid.

Figure 7:
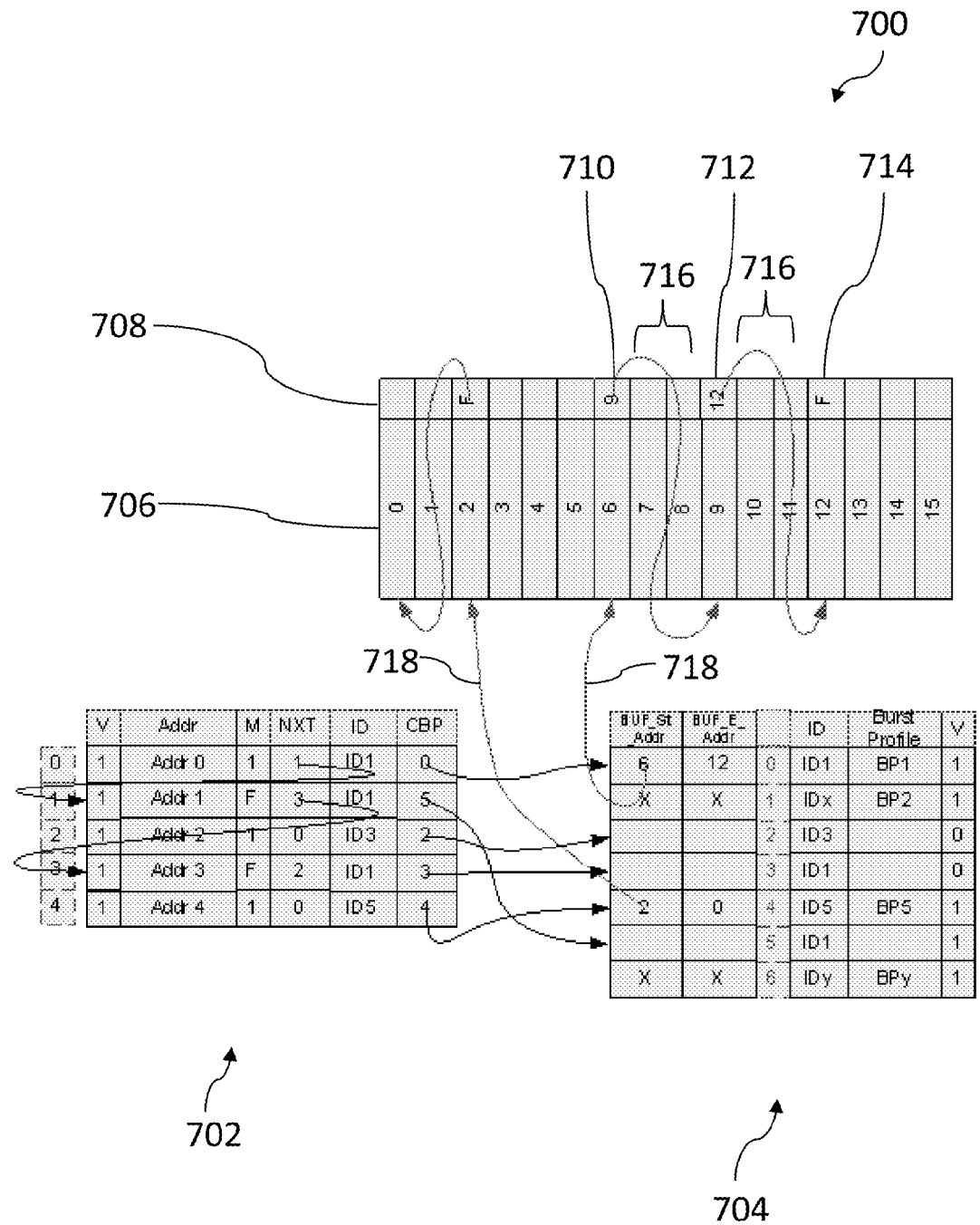
FIG. 7 illustrates a data buffer in accordance with an embodiment of the invention.

A data buffer 700 is illustrated in FIG. 7 (along with an address 702 and a control 704 buffer). The data buffer 700 includes a data field 706 and a next-entry field 708, which indicates a relationship among interleaved data. In one embodiment, interleaved data is maintained as a linked list, in which later-arriving data is linked to previously arriving data. For example, the data 710 at address 6 in the data buffer 700 is linked to additional data 712 at address 9 and data 714 at address 12 via use of the next-entry field 708, despite other data 716 being received in-between the receipt of the linked data 710, 712, 714. The next-entry field 708 associated with the last item of data in the list holds a value of 0xF, indicating the end of the list.

FIG. 7 also illustrates the links 718 between the control buffer 704 and the data buffer 700. For example, entry 0 of the control buffer 704 links to address 6 in the data buffer 700 (as the first data beat 710 of the associated transaction) and to address 12 in the data buffer 700 (as the last data beat 714 of the same transaction). In this example, if an additional beat of data is received for that same transaction, it is stored in the data buffer 700 and linked to the last data item 714 by changing the next-entry field 708 of the last item 714 to reflect the location of the new data. The control buffer 704 is also updated to reflect the new end of the linked list.

Figure 8A:
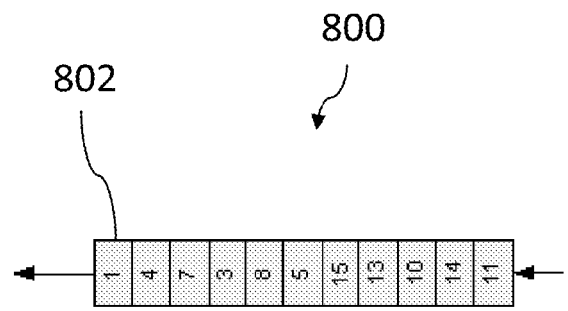
FIGS. 8A, 8B, and 8C illustrate free-buffer-list FIFOs in accordance with embodiments of the invention.
Figure 8B:
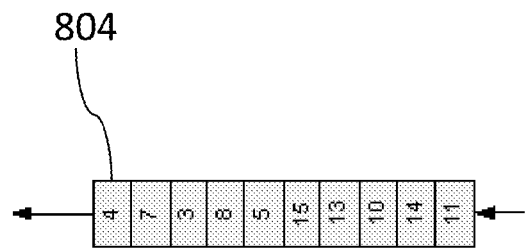
Figure 8C:
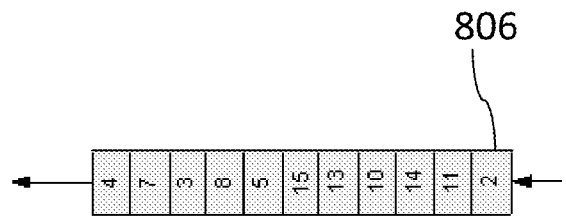
Figure 9:
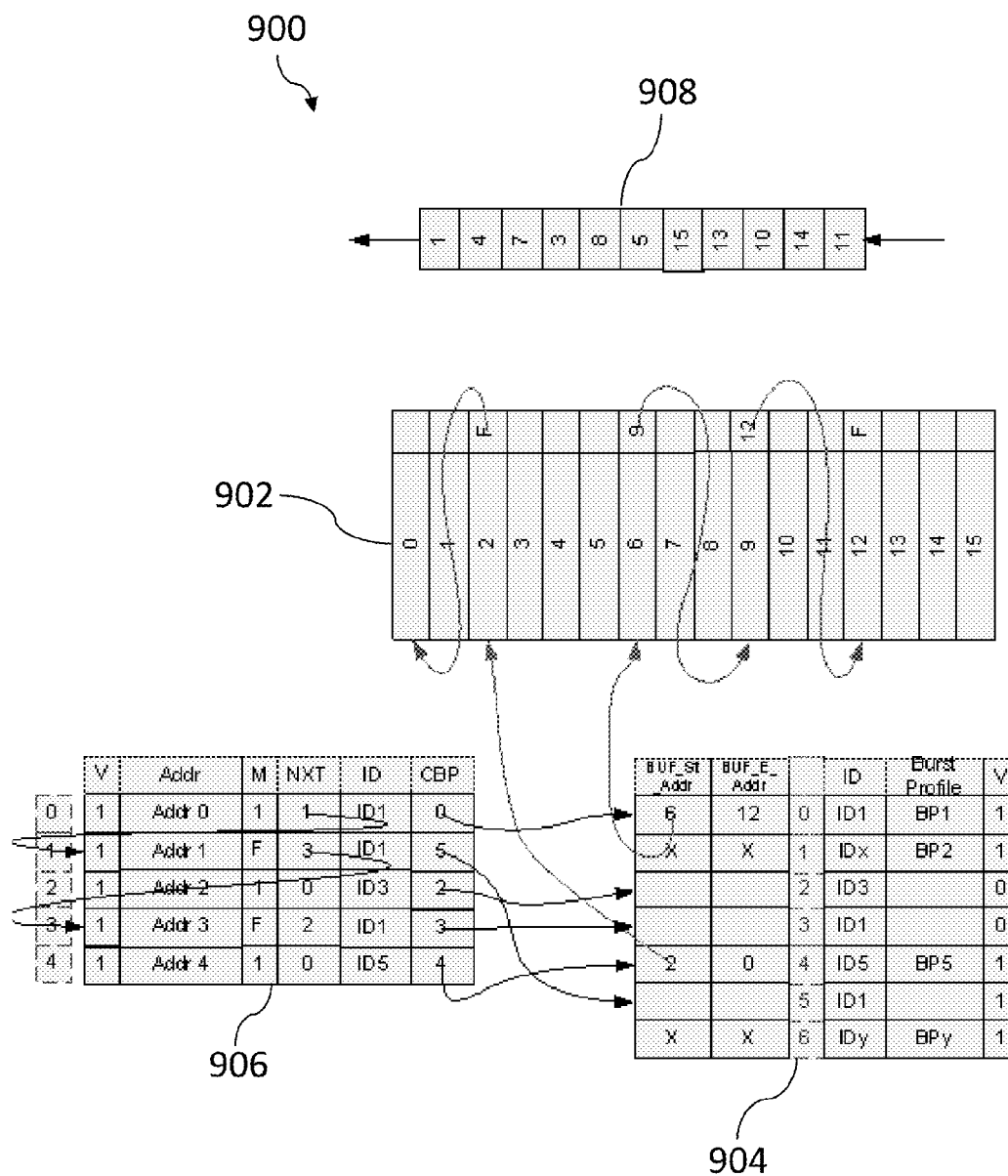
FIGS. 9 and 10 illustrate implementations of slave interface units in accordance with embodiments of the invention.

FIG. 8A illustrates a free-buffer-list FIFO 800 that may be used to track freely available locations in the data buffer. Each available location in the data buffer is an entry in the FIFO; when incoming data arrives, an entry in the FIFO 800 is de-queued and the data is stored at that location. Once data is flushed from the data buffer, its location is queued back into the FIFO 800. In this example, the top 802 of the FIFO 800 holds a value of 1; incoming data is thus stored at location 1 in the data buffer. FIG. 8B illustrates the FIFO 800 when the top entry 802 has been de-queued, and the new top entry 804 is 4. If entry 2 (for example) in the data buffer becomes available, it is queued into the last position 806 in the FIFO 800. FIG. 9 illustrates a system 900 that includes a data buffer 902, a control buffer 904, an address buffer 906, and a free-buffer-list FIFO 908. The FIFO 908 may be included in the control logic 208.

Figure 10:
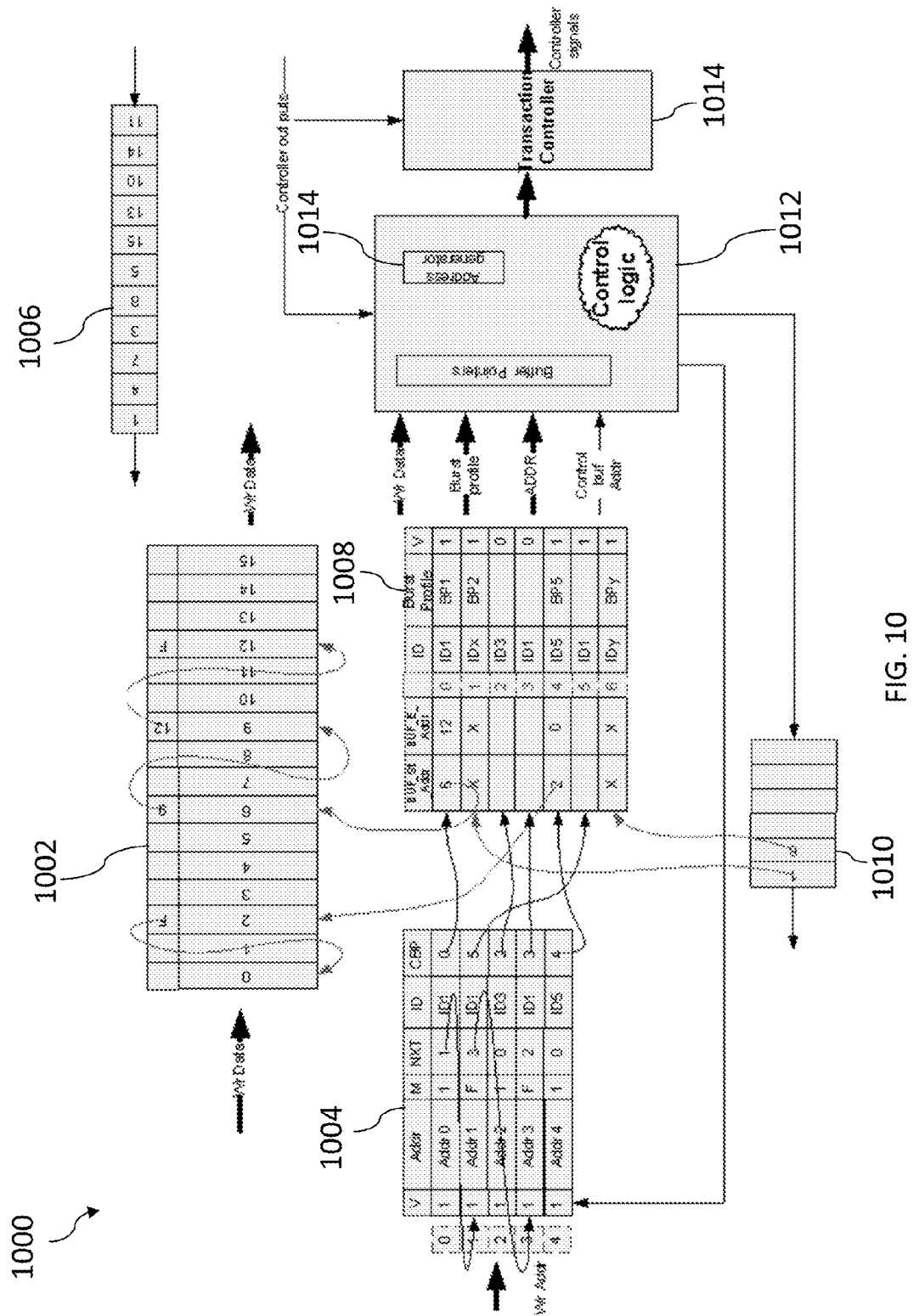

FIG. 10 illustrates another embodiment 1000 of the invention having a data buffer 1002, address buffer 1004, FIFO 1006, and control buffer 1008. Also included in FIG. 10 are further details of the control logic 208 shown in FIG. 2. A completed list 1010 is a FIFO that contains pointers to the control buffer 1008 of transactions that were completed (and/or sent to the slave 108 for completion). The completed list 1010 may store pending, outgoing transactions and be de-queued upon the successful sending of the completed transaction over the bus interface 104. In one embodiment, the completed list 1010 is used to reference the ID tag of a transaction to be sent. The valid bit of the control buffer 1008 may be de-asserted once the transaction response is sent out on the bus 104. In general, a write request received from the bus 104 is honored if there are free entries in the address 1004, control 1008, and data 1002 buffers, and if the completed list 1010 has a free space.

A burst shaper 1012 may disburse transactions (i.e., prepare and send for execution) stored in the buffers 1002, 1004, 1008 and stores them, upon completion and/or sending, in the completed list 1010. The burst shaper 1012 may be used to chop larger burst sizes in to smaller ones to comply with constraints of the slave 108. For example, if a 64 kb burst arrives but the slave 108 supports only 16 kb bursts, the burst shaper 1012 divides the received burst into four 16 kb bursts. When the burst shaper 1012 chops a bigger burst into smaller ones, a burst address generator 1014 outputs the address of the chopped burst (i.e., the "internal" address within the original, larger burst that is now the starting address of a smaller burst). The smaller bursts are then submitted to the slave 108; as each is submitted, its data is sequentially removed from the linked list in the data buffer 1002. A response may be sent out on the bus interface 104 only when all of the chopped, smaller bursts are submitted to the slave 108; at this point (which corresponds to completion of the original, larger burst), the valid bit in the address buffer 1004 corresponding to the transaction is made invalid.

The burst shaper 1012 may also be used to support incoming transactions that are narrower than a maximum width of the bus 104; for example, 8-, 16-, or 32-bit transactions may be received over a 64-bit bus 104. The burst shaper 1012 may expand these narrow transactions to be compatible with a width of the interface 110 to the slave 108. Similarly, the burst shaper 1012 may re-align incoming unaligned transactions and/or support variable data widths (if the slave 108 supports this feature). Finally, a transaction controller 1014 (also known as an efficiency controller or arbitration controller) may be used to select which among a plurality of available transactions will be next executed.

Figure 11:
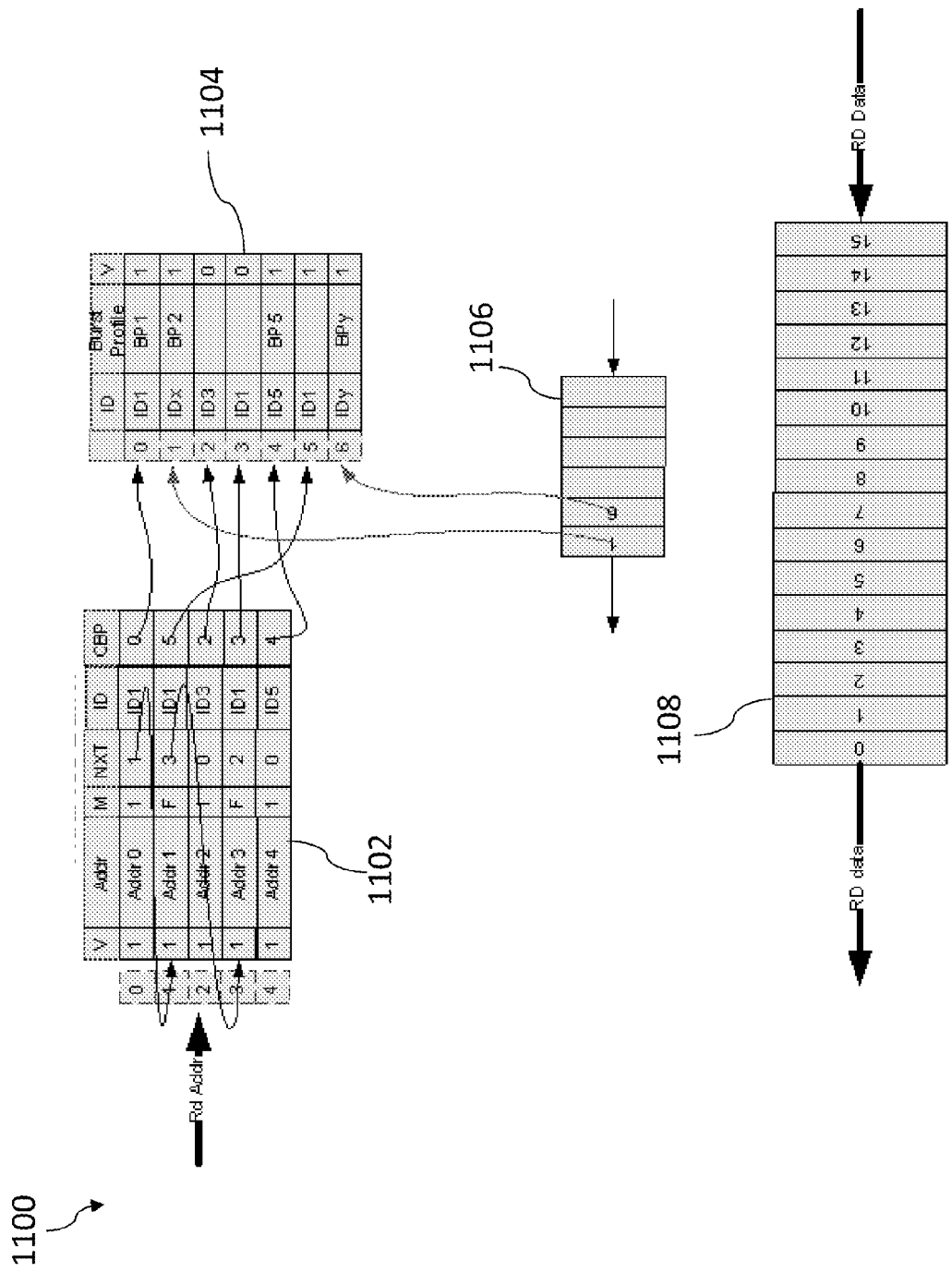
FIG. 11 illustrates a read data path in accordance with an embodiment of the invention.

The above discussion relates to write transactions, but one of skill in the art will understand that much of it applies to read transactions as well. FIG. 11 illustrates a read interface 1100 that includes an address buffer 1102, a control buffer 1104, and a completed list 1106. The data buffer 1108 may be a FIFO because the read data comes from only the slave 108 (i.e., a single source) and there is no interleaving of data. Because of the non-interleaving, the control buffer 1104 may not maintain data pointers for the read data.

Figure 12:
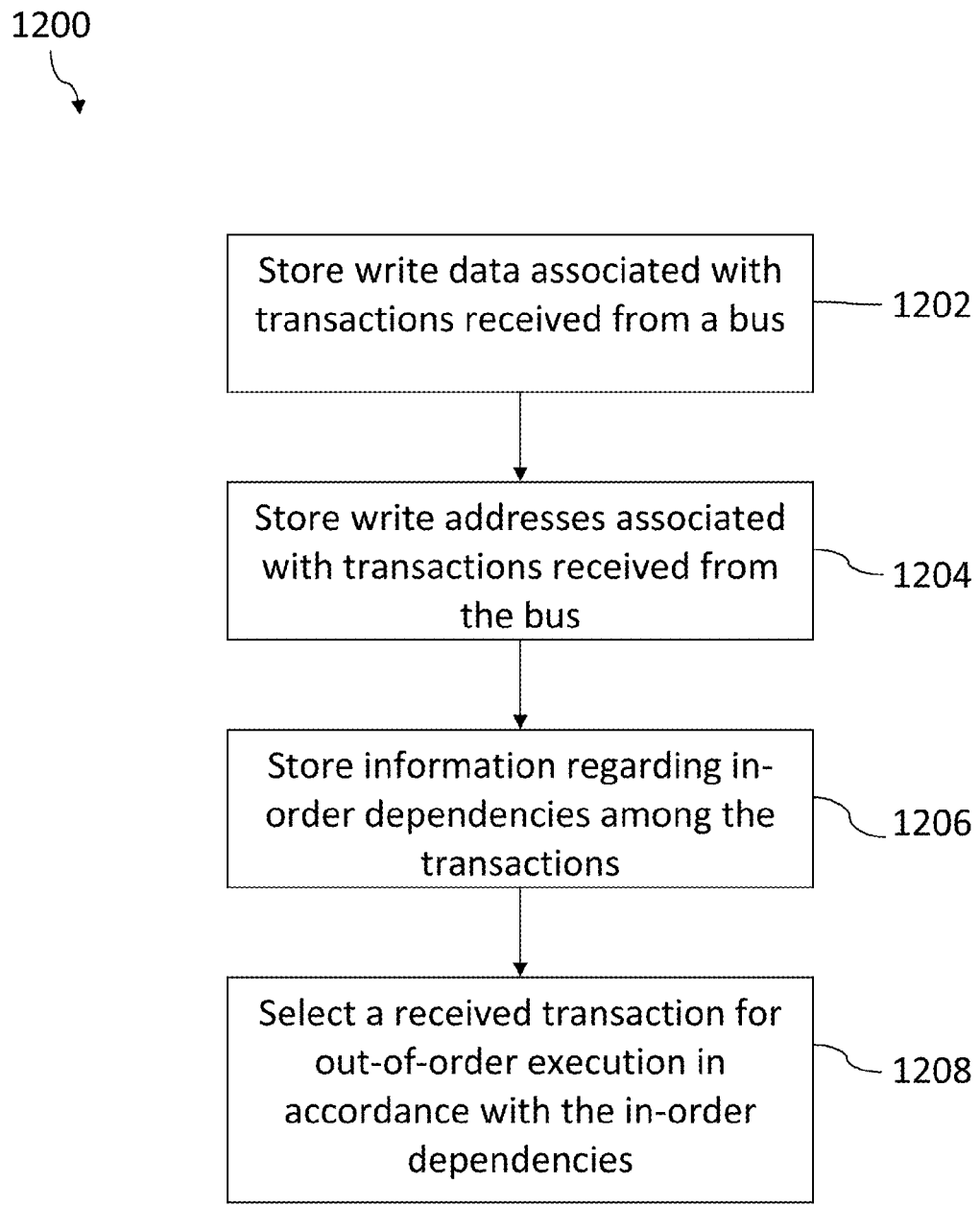
FIGS. 12 and 13 are flowcharts illustrating methods for operating a slave interface unit in accordance with embodiments of the invention.
Figure 13:
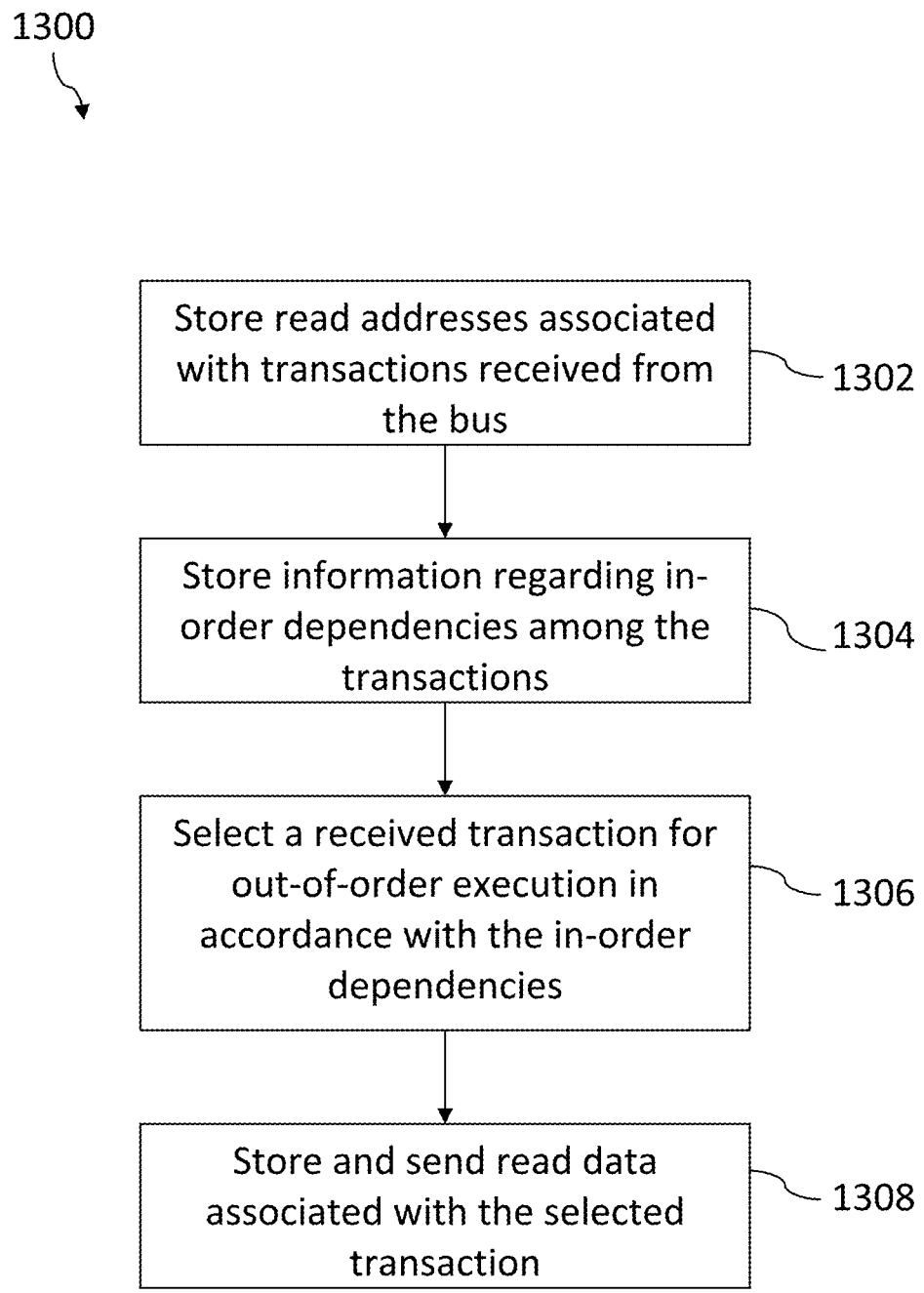

A method for operating a slave-interface unit in accordance with embodiments of the invention is shown in a flowchart in FIG. 12. In a first step 1202, write data associated with transactions received from a bus is stored (in, e.g., a write buffer). In a second step 1204, write addresses associated with transactions received from the bus are stored (in, e.g., an address buffer, and, in a third step 1206, information regarding in-order dependencies among the transactions is stored (as, e.g., a linked list in the address buffer. In a fourth step 1208, a received transaction is selected for out-of-order execution in accordance with the in-order dependencies. FIG. 13 illustrates a corresponding read transaction, in which received read addresses are stored (step 1302), as is information regarding any in-order dependencies (step 1304). A read transaction is selected for execution (1306), and, when the corresponding read data is received back from the slave, it is stored (in, e.g., a FIFO) and sent back to the master (step 1306).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for executing bus transactions, the system comprising:
    a data buffer for storing write data associated with a plurality of transactions received from a bus;
    an address buffer for storing (i) write addresses associated with the plurality of transactions received from the bus and (ii) information regarding in-order dependencies among the plurality of transactions, wherein the address buffer includes a plurality of linked lists; and
    control circuitry for selecting a received transaction from the plurality of transactions for out-of-order execution in accordance with the in-order dependencies thereby interleaving execution of transactions from the plurality of linked lists, wherein selecting the received transaction for out-of-order execution includes reviewing transactions for which an associated mask bit has an on value.

2. The system of claim 1, wherein each of the plurality of linked lists comprises a series of in-order transactions.

3. The system of claim 2, wherein selecting the received transaction comprises selecting a head of one of the series of the in-order transactions.

4. The system of claim 1, wherein the data buffer comprises a linked list.

5. The system of claim 4, wherein the linked list comprises a series of related write data received on the bus interleaved with unrelated write data.

6. The system of claim 1, wherein the control circuitry comprises a control buffer for storing information linking write data and write addresses.

7. The system of claim 1, wherein the control circuitry comprises an arbitration unit for selecting the received transaction.

8. The system of claim 1, wherein the control circuitry comprises a free-buffer-list FIFO for storing available locations in the data buffer.

9. The system of claim 1, wherein the control circuitry comprises a burst shaper for chopping a received burst into smaller bursts.

10. The system of claim 1, wherein the control circuitry comprises a completed list for storing information regarding completed transactions.

11. A method for executing bus transactions, the method comprising:
    storing write data associated with a plurality of transactions received from a bus;
    storing write addresses associated with the plurality of transactions received from the bus;
    storing information regarding in-order dependencies among the plurality of transactions, wherein storing information regarding in-order dependencies includes linking a first series of transactions and linking a second series of transactions,
    selecting a received transaction from the plurality of transactions for out-of-order execution in accordance with the in-order dependencies, thereby interleaving execution of transactions from the first series of transactions and transactions from the second series of transactions, wherein selecting the received transaction for out-of-order execution includes reviewing transactions for which an associated mask bit has an on value.

12. The method of claim 11, wherein linking the first series of transactions includes linking a first in-order transaction to a second in-order transaction.

13. The method of claim 12, wherein selecting the received transaction comprises selecting a head of one of the first and second series of linked transactions.

14. The method of claim 11, wherein storing write data comprises linking a series of related write data received on the bus interleaved with unrelated write data.

15. The method of claim 11, further comprising shaping a burst of write data in accordance with a slave interface.

16. The method of claim 13, further comprising removing the selected received transaction from the head of the respective series of linked transactions such that a next transaction in the respective series of linked transactions becomes the head.

17. The method of claim 16, further comprising changing a value of a the mask bit for the next transaction to on.

18. The method of claim 11, further comprising:
    setting a value of the mask bit to on for a head of the first series of transactions and for a head of the second series of transactions, and setting the value of the mask bit to off for other transactions in the first and second series.

19. A system for executing bus transactions, the system comprising:
    a data buffer for storing write data associated with a plurality of transactions received from a bus;
    an address buffer for storing (i) write addresses associated with the plurality of transactions received from the bus and (ii) information regarding in-order dependencies among the plurality of transactions, wherein the address buffer includes a plurality of linked lists; and
    means for selecting a received transaction from the plurality of transactions for out-of-order execution in accordance with the in-order dependencies thereby interleaving execution of transactions from the plurality of linked lists, wherein selecting the received transaction for out-of-order execution includes reviewing transactions for which an associated mask bit has an on value.

\* \* \* \* \*